Dec. 18, 1934.     E. R. PERSON     1,984,697
MACHINE FOR BLOWING HOLLOW ARTICLES
Filed Oct. 30, 1931     8 Sheets-Sheet 1
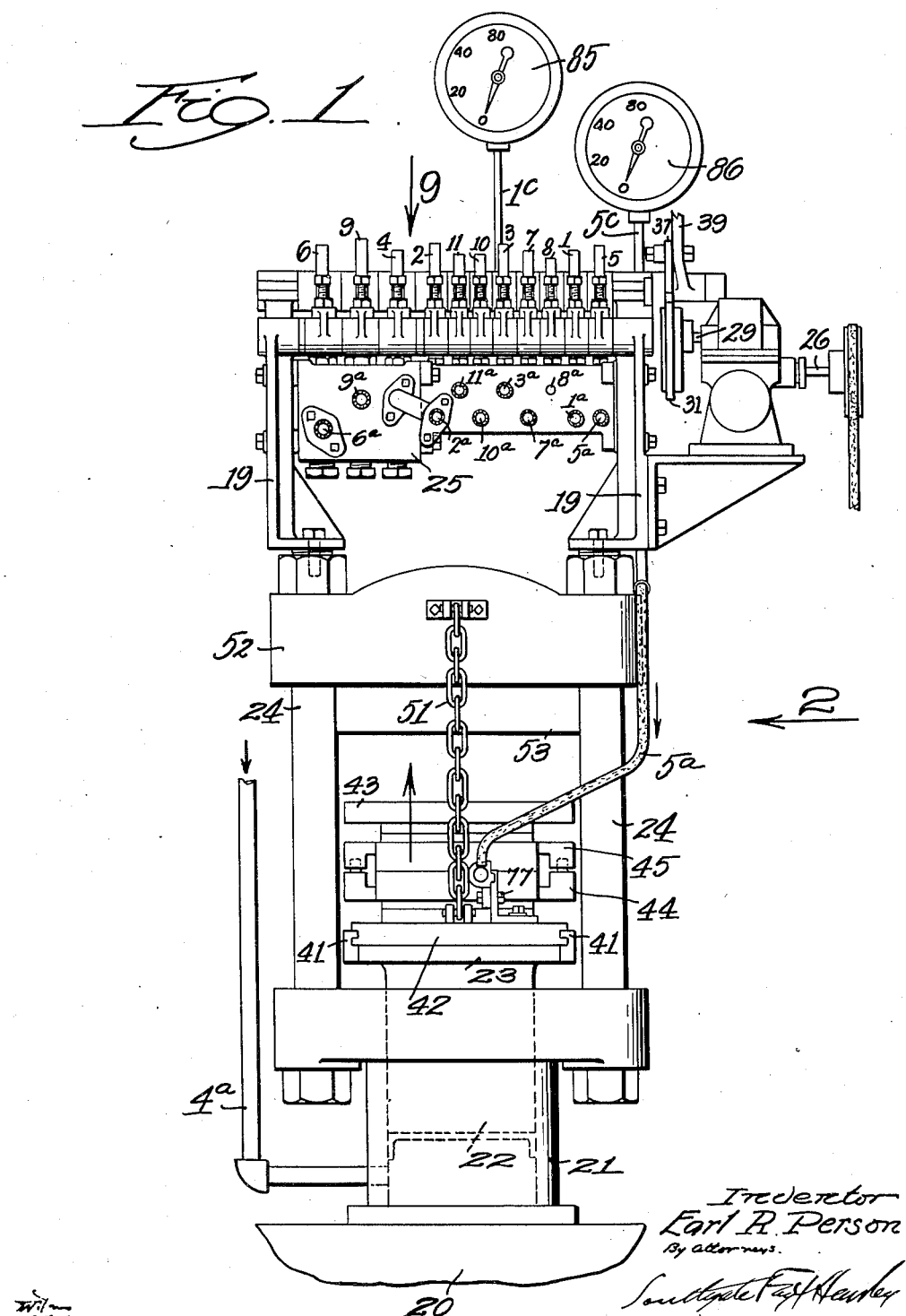

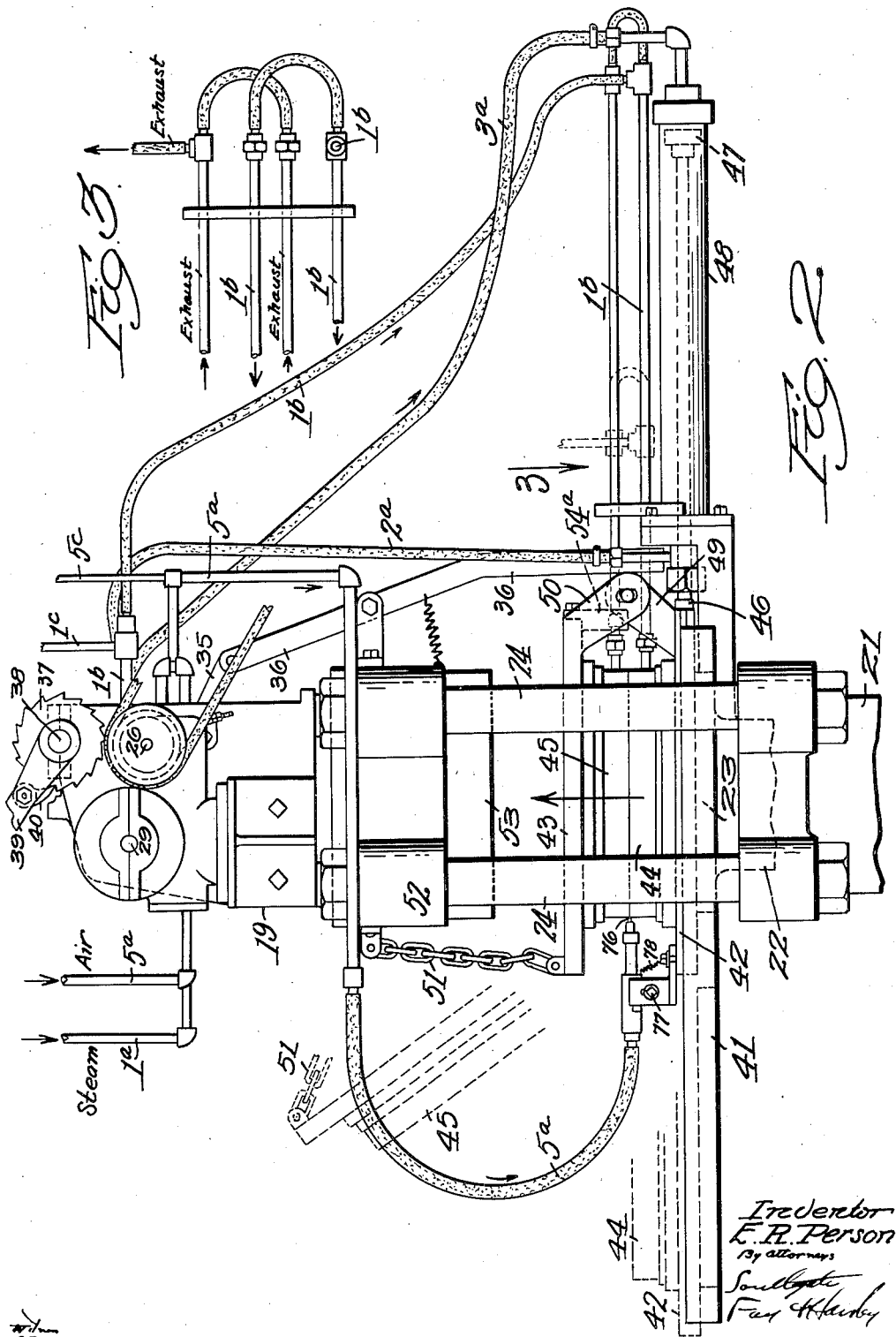

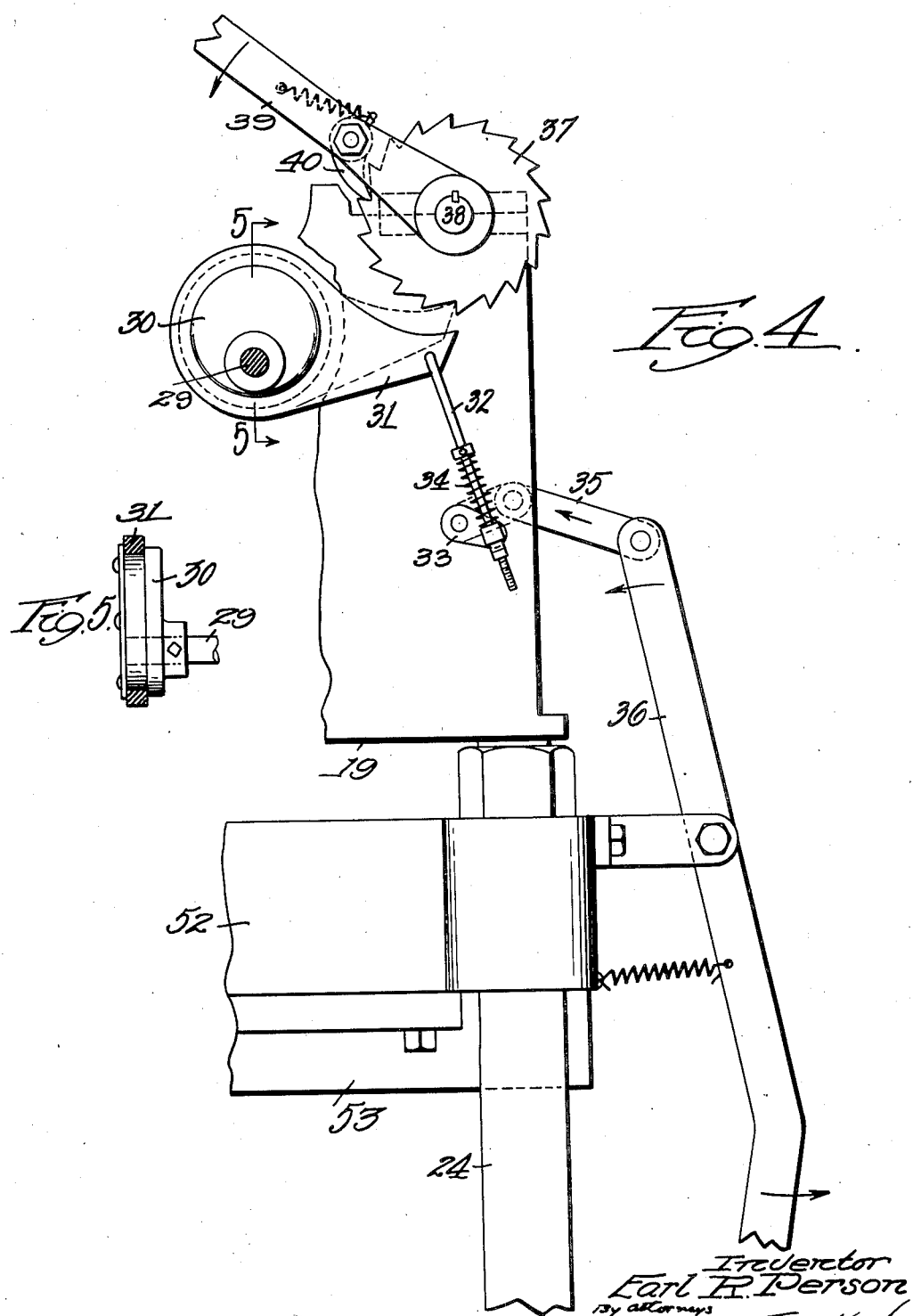

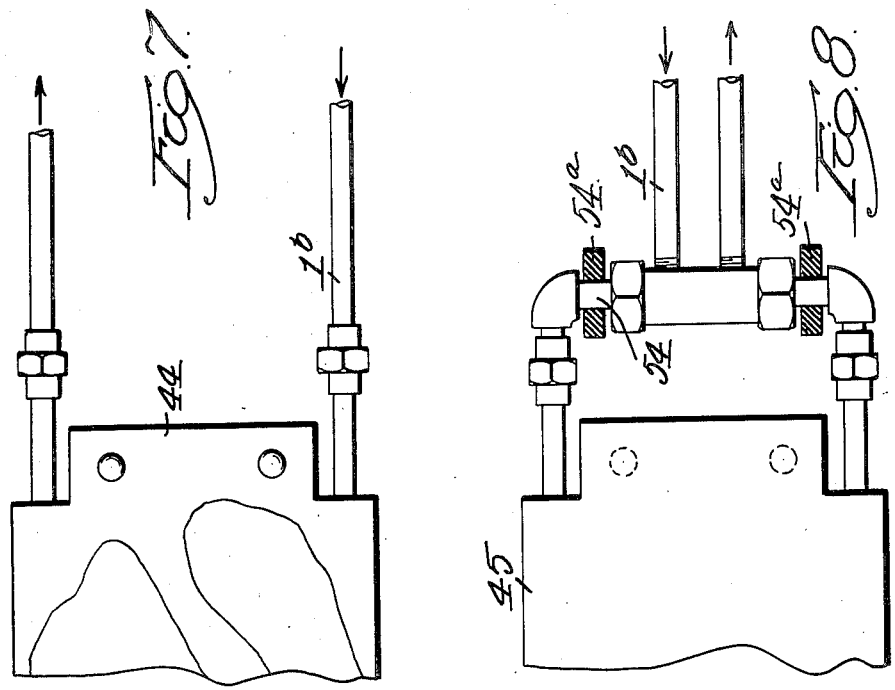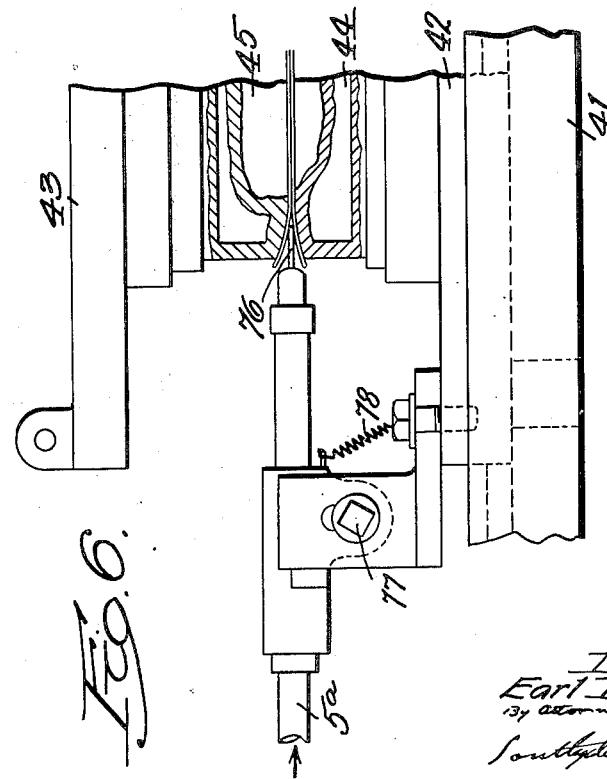

Dec. 18, 1934.  E. R. PERSON  1,984,697
MACHINE FOR BLOWING HOLLOW ARTICLES
Filed Oct. 30, 1931  8 Sheets-Sheet 5

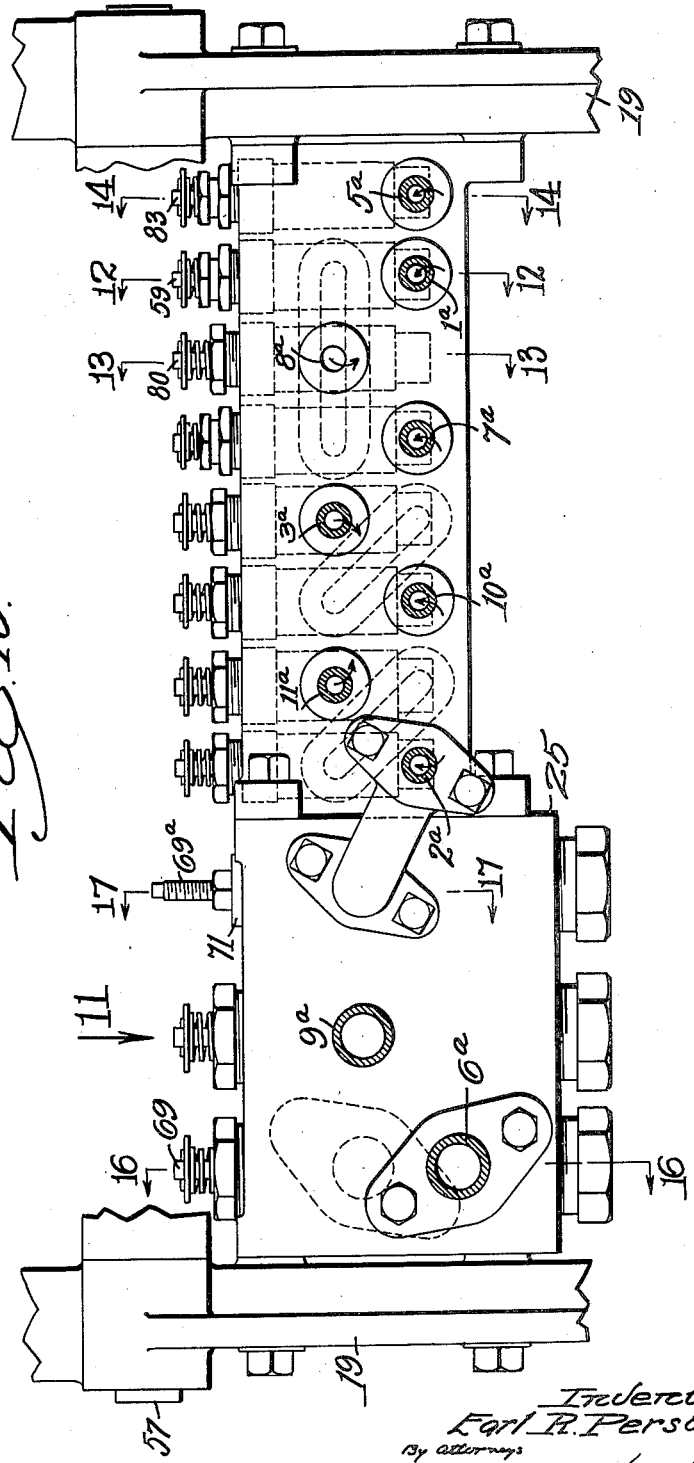

Dec. 18, 1934.  E. R. PERSON  1,984,697
MACHINE FOR BLOWING HOLLOW ARTICLES
Filed Oct. 30, 1931  8 Sheets-Sheet 7
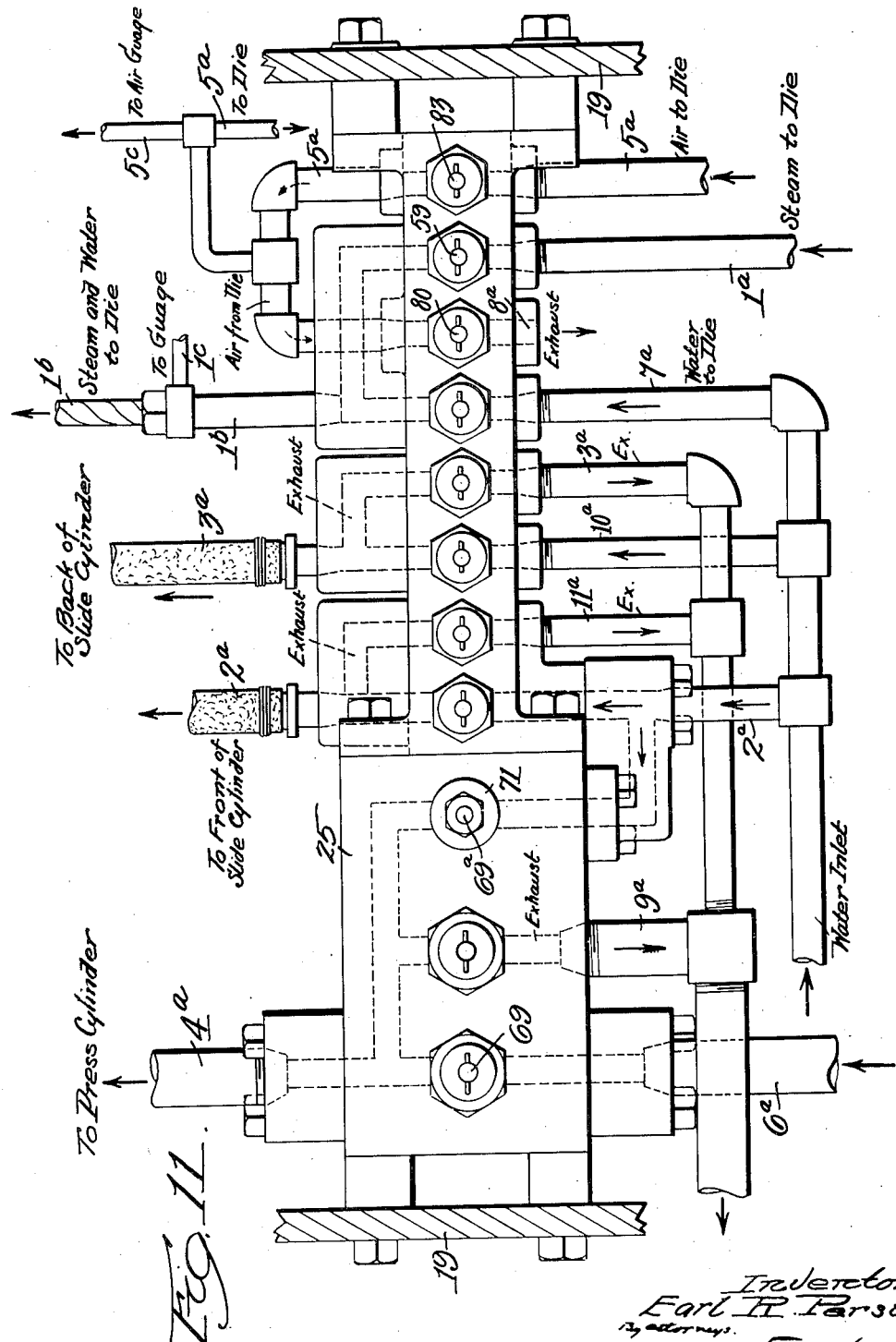

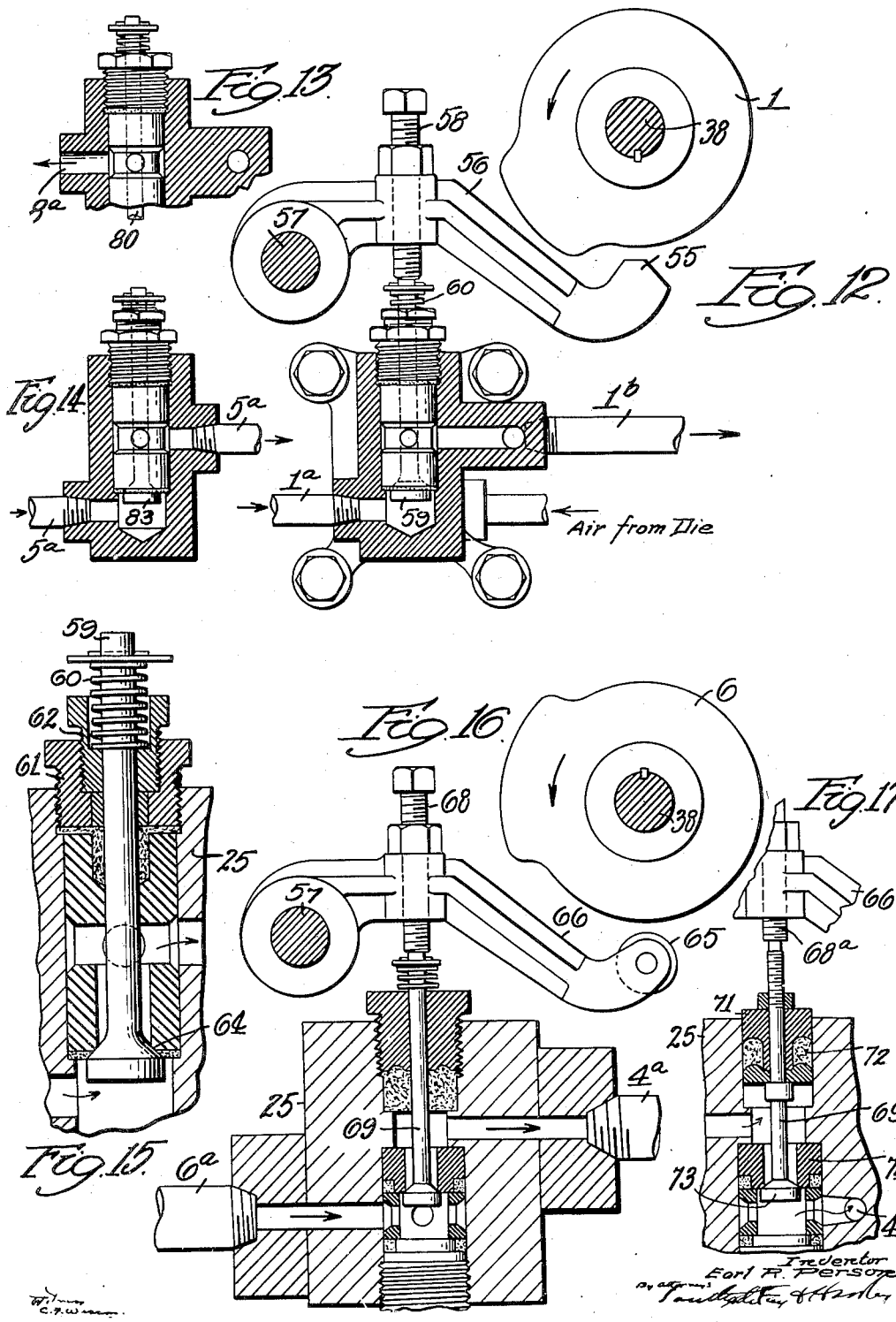

Patented Dec. 18, 1934

1,984,697

UNITED STATES PATENT OFFICE 1,984,697

MACHINE FOR BLOWING HOLLOW ARTICLES

Earl R. Person, Leominster, Mass., assignor to E. I. du Pont de Nemours & Company, Wilmington, Del., a corporation of Delaware Application October 30, 1931, Serial No. 572,118

19 Claims. (Cl. 18—19)

This invention relates to the production of hollow articles by introducing fluid under pressure between two sheets of pyroxylin or other plastic sheet material in dies for the purpose of shaping the same to the contour of the dies.

The principal objects of the invention are to provide a complete automatic machine, which, after the dies are provided with the sheet material, will automatically go through a cycle of operations to move the die unit to a definite position, to introduce air into the die between the two sheets of material, to apply added pressure to the dies for cutting the material around the edge and thus complete the operation and, more specifically stated, to first introduce heat into the dies to heat them, then automatically slide the dies from loading position back into pressing position; to introduce water under low pressure, as for example city water, behind a plunger to force the dies against a stationary part of the machine; to introduce air into the dies between the two sheets of material; to introduce high pressure water into the same cylinder to cut the waste from the sheet material; to introduce cold water into the dies for the purpose of cooling the dies and sheet material, thereby setting the object to be molded in the dies; to let the air out of the said object; to exhaust the water from the cylinder, and to move the dies out of the machine and open them ready for the article to be removed and for the new material to be put in.

Other objects of the invention are to provide automatic means by which this series of operations is performed and the machine brought to a stop without any human supervision and provide improvements in the details thereof.

Other objects and advantages of the invention will appear hereinafter.

Reference is to be had to the accompanying drawings, in which

Fig. 1 is a front elevation of a complete machine, constructed in accordance with this invention;

Fig. 2 is a side elevation of the same;

Fig. 3 is a plan of certain piping connected with the die;

Fig. 4 is a side elevation on enlarged scale showing automatic means for setting the machine in motion after it has been started by hand;

Fig. 5 is a sectional view on the line 5—5 of Fig. 4;

Fig. 6 is a side view on enlarged scale of the pair of dies showing the two sheets of stock therein and the means for introducing air, the dies being shown partly in section;

Fig. 7 is a plan of the lower die;

Fig. 8 is a plan of the top die;

Fig. 10 is a front elevation on enlarged scale of the mechanism shown at the top;

Fig. 11 is a plan of the same;

Figure 9:
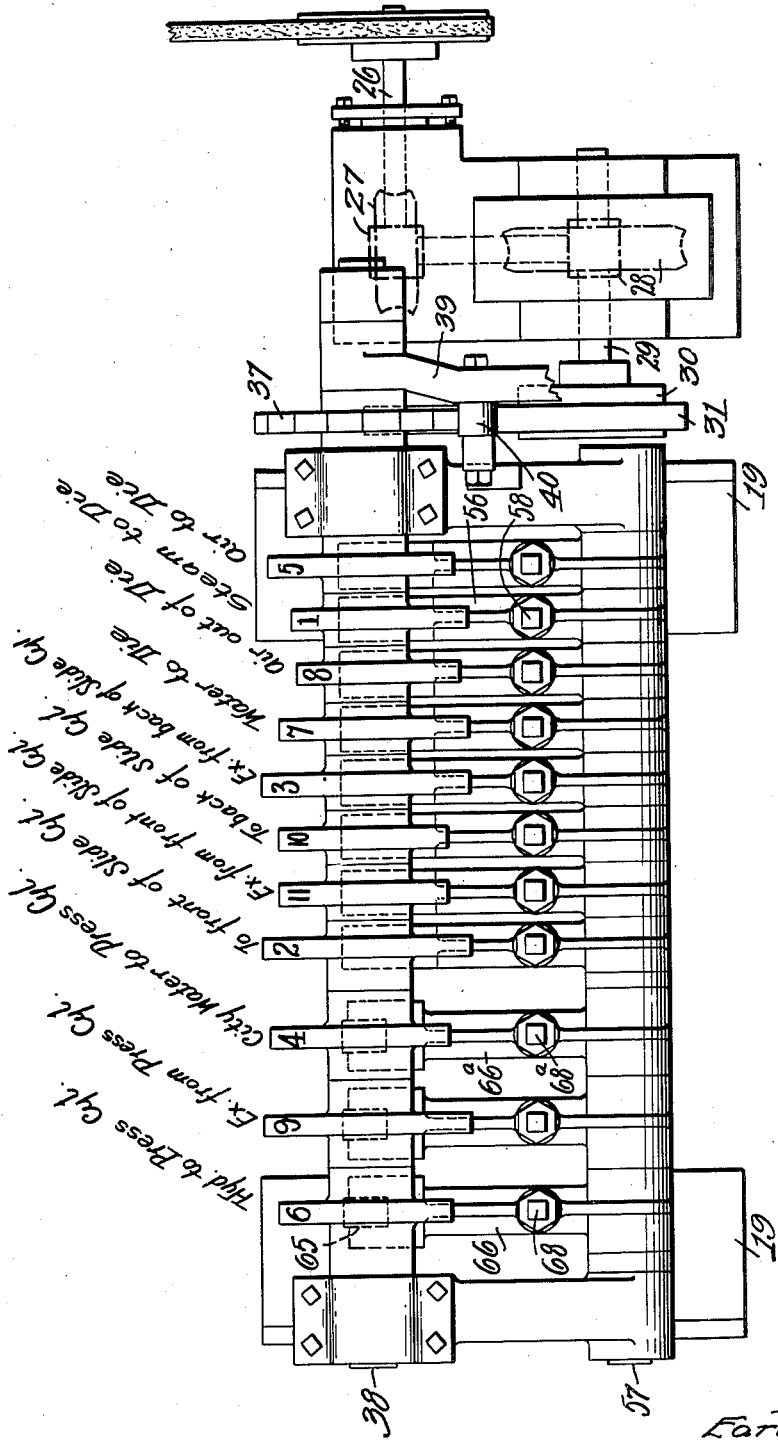
Fig. 9 is a plan of the top of the machine on enlarged scale showing the cam shaft and indicating the sequence of operations.

Figs. 12, 13 and 14 are sectional views on the lines 12—12, 13—13 and 14—14 of Fig. 10;

Fig. 15 is a full sized sectional view of the valve shown in Fig. 12 taken on a plane at right angles to that figure, and Figs. 16 and 17 are sectional views on the lines 16—16 and 17—17 of Fig. 10.

The machine is shown in a form comprising a base 20 on which is located a cylinder 21 having a single acting plunger 22 therein, provided with a top plate 23 which is adapted to move up and down with the plunger. Carried by the cylinder is a frame comprising upright rods 24 on which is carried the head 52 of the press. Above this head on the rods 24 is supported the operating frame 19. On this frame is a main shaft 26 provided with a pulley or other means for transmitting power to it from a motor or other source of power.

This shaft, through double reduction gearing comprising two worms and worm wheels 27 and 28, delivers power to a parallel shaft 29. On this shaft 29 is an eccentric 30 which is provided with a pawl 31. This pawl is connected by a hook 32 with a lever 33 and a spring 34 is provided between a collar on the hook and the lever to force the pawl inwardly. This lever is connected by a link 35 and a lever 36 to be operated at certain times as will appear, to swing the lever 33 into a position to move the pawl from the full line position in Fig. 4 to the dotted line position. In the dotted line position this pawl engages the teeth of a ratchet wheel 37 fixed on a cam shaft 38.

Oscillatably mounted on this cam shaft is a hand lever 39 having a spring-pressed pawl 40. It will be enough to say at present that, when the machine is not operating automatically, the motion of the hand lever 39 will advance the rotation of the shaft 38 through the pawl 40 and ratchet wheel 37 one or more steps at the beginning of the operation. The machine then operates automatically through a complete turn of the shaft 38 bringing it back to its original inoperative position. This, of course, is done through the lever 36 as will appear.

The plate 23 is provided with guides or ways 41 for the bottom plate 42 of the mold or die holder. The die holder consists of the bottom plate 42 and a top plate 43 which by a well known means carry the lower die 44 and the upper die 45. These dies are provided with upper and lower cavities for receiving the stock and they are also made hollow for receiving steam to heat them and bring the stock into properly pliant and soft condition for molding and then receiving water to chill the stock in the position in which it is molded.

The bottom plate or slide 42 is movable along the ways 41 and connected at one end with a piston rod 46 for operating the slide. The piston 47 is in the cylinder 48 and, as will be described later, the whole die is moved from the position shown in full lines in Fig. 2 to the dotted line position shown therein and back again.

The bottom plate 42 is provided with arms 49 to which are pivoted with a loose pivot arms 50 connected with the top plate 43. At the free end of the top plate is connected a chain 51 or other flexible connection and its upper end is held by a stationary head 52 which supports an anvil 53 below it and is carried by the frames or rods 24.

It will be seen therefore that when the die moves out into loading position, as shown in dotted lines in Fig. 2, the chain will act to raise the upper die and open the die or mold for the removal of the article molded and the replacement of a pair of sheets of pyroxylin or other stock therein in the position indicated in Fig. 6. It is the arms 49 and 50 on one side which constitute the means for engaging the lever 36 when the die is pulled back to operative position, shown in full lines in Fig. 2, to throw the pawl 31 into the dotted line position, shown in Fig. 4.

It has been stated that the two dies are provided with spaces inside, not communicating with the die surface, to be filled with steam or water for heating and cooling. Fig. 7 shows the simple means connected with flexible pipes 1$^b$ for introducing the steam or water on one side of the bottom die and exhausting it on the other and Fig. 8 shows a similar arrangement for the upper die but modified because this die is pivoted on a pipe 54 which is supported by brackets 54$^a$.

Although all the mechanism has not yet been described in full, the sequence of operations will now be described. Assuming that the die is in dotted line position, Fig. 2, and that the two sheets of pliable material, previously heated on a steam table, have been laid on the bottom die, one over the other, the operator turns the handle 39 to rotate the wheel 37 through one or more notches. On the shaft 38 are a plurality of cams. They are numbered in Fig. 9 to indicate the sequence of operations from 1 to 11 inclusive. The turning of the shaft through the space of one tooth, of course, turns all these cams but only cam No. 1 is turned thereby into a position to produce any result. This first step of the shaft 38 moves this cam, as shown in Fig. 12, far enough to depress a slanting surface 55 on a lever 56 which is mounted to oscillate freely on a stationary shaft 57. This lever 56 has an adjusting screw 58 bearing on a valve stem 59 which is held up by a spring 60.

This valve stem passes through a nut 61 and screw packing 62 and is located in a valve chamber 25 having a valve seat 64. Normally there is pressure of steam through a pipe 1$^a$ into the interior of this valve chamber and on the bottom of the valve on the stem 59. Not only the spring 60 but this pressure operates to hold the valve closed. When the valve is pushed by the cam 1, the valve is thereby opened and the steam passes into a pipe 1$^b$. This pipe is flexible and, as stated above, it supplies steam to the two pipes 1$^b$ which are merely branches of it to the interior of the top and bottom dies. This happens when the parts are in dotted line position in Fig. 2 and is done of course for the purpose of heating this die before the stock is confined in them or pressed in any way.

Now the operator, allowing as much dwell as he thinks necessary for the purpose of properly heating the dies, advances the handle 39 one more step. The cam 2 now operates, through mechanism of exactly the same nature, to introduce water under what I would call low pressure, that is, usually from the city water mains, into the near side of the cylinder 48 through a flexible pipe 2$^a$.

The effect of this, as has been stated, is to push back the piston 47 and move the die over to the full line position in Fig. 2. Of course, there is a pipe 3$^a$ extending from the back end of this cylinder to a valve operated by the cam 3 which, of course, operates at the same time as the cam 2, to release the back pressure through a pipe 3$^a$ and allow this action to take place.

It will be noted that at this time the lever 36 has been pushed back by the arm 49 at the end of this stroke as indicated by the arrows in Fig. 4. This brings the pawl 31 into engagement with the teeth of the ratchet 37.

It will be understood that the shaft 29, of course, has been rotating idly during the previously described actions. Now, on the next rotation of the shaft 29, the pawl 31 will move the ratchet 37 one more step automatically. Now cam No. 4 comes into action and depresses a roll on the lever 66$^a$ pivoted on the shaft 57 and operating like the lever 56. The screw 68$^a$ operates the valve stem 69$^a$ and the pressure of the water behind is relied upon to close this valve against its seat 74. See Fig. 17. This valve stem carries a piston 71 with a packing 72 below. In the valve casing 25 is introduced water through the valve seat 74 from the city mains or other comparatively low pressure supply.

When the valve is open the water is admitted through a pipe 4$^a$ below the piston 22 to raise that piston and therefore take up with it the die until it engages the anvil 53. Now the cam 5 operating like cam 1, acts to bring the air pressure through a valve 83 (Fig. 14) from a suitable source into a pipe 5$^a$ through valve 83 into a nozzle 76. The pipe 5$^a$ is flexible and this nozzle is pivoted loosely on a stud 77 carried by the slide 42 and having a spring 78 for moving the nozzle downward. The operator had already placed this nozzle 76 in over the lower sheet of stock and under the upper one. The action of the cam 5 is to introduce air between the two sheets of stock as indicated in Fig. 6 for the purpose of blowing these two sheets apart into the cavities of the upper and lower dies, thus producing in the dies a hollow article.

The next step of rotation of the shaft 38 causes the cam 6 to operate and this acts through a roll 65 and lever 66, which is like the lever 66$^a$. At the same time the cam 4 allows the valve 69$^a$ to close. The lever 66 carries a screw 68 operating a valve stem 69 as shown in Fig. 16, to introduce water under high pressure into the valve casing and from a pipe or passage 6$^a$ which delivers this water into the pipe 4ª which has been used previously to introduce water under a lower pressure. The result of this is to increase the pressure under the plunger 22 and force the two die members together. This action cuts off the stock of the two sheets of pliable material around the edges and leaves the waste on the outside of the dies.

Now the dies have to be cooled while the stock is in them and under pressure. Cam 7, operating next, performs this function, admitting water under low pressure from a pipe 7ª through a valve like the valve 59 into the pipe 1ª. Of course, the steam which was introduced into these pipes in the first place was exhausted as soon as the cam 1 passed around out of engagement with the lever 56. This water is introduced, therefore, as shown in Figs. 7 and 8, into the cavities behind the die surfaces and these dies are cooled so that the article inside is chilled and set.

Now the cam 8 comes into operation and, through a valve like 83, allows the air to be exhausted from the inside of the article in the die. This takes place through a simple valve stem 80 connected with the pipe 5ª. The air from all this system of piping 5ª is exhausted into the air at 8ª.

Now, at the next stop, the cam 9 operates to exhaust the water from the press cylinder 21 through a valve like 69 into an exhaust pipe 9ª. This, of course, causes the whole die to drop back to the position shown in Fig. 1.

Only two more operations are to be performed and both of these take place immediately on the next two advance steps of the cam shaft 38. The cam 10 operates a valve like 59 to introduce water under low pressure from a pipe 10ª through the pipe 3ª to the back side of the piston 47 to slide the die out to the dotted line position and immediately the cam 11 operates through a similar valve to let the water out from the front of the piston 47 through a pipe 11ª from the pipe 2ª to permit this action to take place. Now the die, being back in the dotted line position, has opened automatically and the operator takes out the hollow molded article and replaces it by two more sheets of plastic material previously heated. Then he has to start up the machine again by manipulation of the handle 39 as stated above.

In order to provide for showing the pressure for the usual purpose, the pipe 1ª is connected by a pipe 1ᵇ and a pipe 1ᶜ with a gauge 85 to show the steam and water pressure. In the same way the pipe 5ª is connected by a pipe 5ᶜ with an air pressure gauge 86 to show the pressure of the air which is introduced between the two sheets of plastic material in the die.

It will be seen, therefore, that the machine is under hand control through one or more steps of the ratchet wheel 37. This ratchet wheel is fixed on the shaft 38 and is the only means for operating it. After these steps are accomplished, this ratchet wheel is moved around automatically in the manner that has been described until it reaches the point at which the entire operation of the machine has been accomplished and the die brought out in open position and opened. At this point the main operating handle 39 and pawl 40 have been brought back to the original position, and so located as to start the machine again when it has been loaded and is ready for operation.

This machine accomplishes the various functions desired in a simple manner and requires no supervision except what can be provided by the man who loads the machine. While the machine is operating after he has stopped using the lever 39, he has time to place more sheets on the steam table and to pick up the two sheets therefrom and get them ready for the next operation. Of course, he picks up these two sheets only after the die is brought out in open position and after he has removed the molded object.

Although I have illustrated and described only one form of the invention I am aware of the fact that many changes can be made therein without departing from the scope of the invention as expressed in the claims. Therefore I do not wish to be limited to the form shown, but what I claim is:—

1. In a machine for molding hollow articles from plastic stock, the combination of a pair of dies, a plunger adapted to operate to move the dies, and a stationary anvil against which the pressure of the plunger is exerted through the dies, of means for introducing fluid under low pressure behind the plunger to move the dies against the anvil, means for then introducing air under pressure directly between the two sheets of plastic material located against the respective die surfaces, and means for thereafter introducing fluid under high pressure from a separate source against the plunger to force the dies together under high pressure and cut off the sheet stock around the dies.

2. In a machine for molding hollow articles from plastic sheet stock, the combination of a pair of dies for receiving a pair of sheets of stock, means for forcing said dies together under low pressure, means for introducing air into a space between the two sheets of stock to force both sheets against their respective die surfaces, and means for thereafter forcing the dies together under high pressure to cause the dies to cut through the sheet stock and separate the waste from the stock used in the article to be molded.

3. In a machine for molding hollow articles from plastic sheet stock, the combination with the dies for molding the sheet stock and a plunger for forcing them together, of hand-controlled means for moving the die from loading to pressing position, means controlled by the movement of the die for causing fluid under pressure to be introduced behind said plunger for the purpose of forcing the dies together under pressure, means for thereafter introducing air under pressure between the two sheets of material in the die to expand the material against the molding surfaces of the dies, and means for then introducing behind said plunger fluid under relatively high pressure to force the dies together with sufficient force to cut the surrounding edges of the two sheets of material from the material being molded and separate the waste therefrom.

4. In a machine for molding hollow articles from plastic sheet stock, the combination with the dies for molding the sheet stock, of means for controlling the admission of steam into the dies out of contact with their molding surfaces to soften the sheet material, hand-controlled means for moving the dies from loading to pressing position, means for introducing pressure for the purpose of forcing one die against the other under pressure, means for controlling said introduction of pressure by the movement of the dies and means for automatically introducing air under pressure between the two sheets of material in the die to expand the material against the molding surfaces of the two dies.

5. In a machine for molding hollow articles from plastic sheet stock, the combination with a pair of dies and means for forcing them together, of a shaft, means on the shaft for thereafter introducing air under pressure between two sheets of stock placed in the dies to expand them under pressure against the die surfaces, means on the shaft for introducing a heating fluid into the dies beyond the die cavities to soften the sheet stock, and means on the shaft for thereafter automatically removing the heating fluid and introducing a cooling fluid into the same spaces for setting the molded article against the die surfaces.

6. In a machine for molding hollow articles from plastic stock, the combination with the dies for molding the stock, of operating means for controlling the admission of steam into the dies out of contact with their molding surfaces to soften the material, hand-controlled means for moving the dies from loading to pressing position, means whereby the movement of the die will set said operating means to be operated automatically, and means for automatically introducing pressure behind the dies for the purpose of forcing them together under pressure.

7. In a machine for molding hollow articles from plastic sheet stock, the combination with a set of dies adapted to receive between them two sheets of heated plastic stock, means for automatically introducing fluid under pressure to close the dies, means for then introducing fluid under pressure between the two sheets of stock in the dies to expand the stock into contact with the dies, means for automatically introducing fluid under a greater pressure behind one of the dies to cut the waste stock from the material molded in the dies, means for introducing water into the dies around the mold cavities to chill the dies and set the stock therein in its molded shape, means for then cutting the air off from the interior of the article being molded, and means for relieving the dies of the pressure and separating them automatically.

8. In a machine for molding hollow articles from plastic sheet stock, the combination with a set of dies adapted to receive between them two sheets of plastic stock, a shaft, means operated by the shaft for introducing pressure behind one of the dies to close the pair of dies, means operated by the shaft for then introducing fluid under pressure between the two sheets of stock in the dies to expand the stock into contact with the dies, means operated by the shaft for introducing fluid into the dies around the mold cavities to chill the dies and set the stock therein in its molded shape, and means operated by the shaft for relieving the dies of the pressure and separating them automatically.

9. In a machine for molding hollow articles from plastic sheet stock, the combination with a set of dies and a molding machine comprising a plunger and a stationary anvil, whereby the plunger can be used to force the dies against the anvil, said set of dies being movable into and out of the molding machine, of means for moving the dies transversely into the molding machine, means controlled by the bringing of the dies back to molding position for introducing fluid under pressure behind the plunger, means for automatically forcing the dies out of the machine after the molding operation is completed, and means for automatically opening the dies by their movement out of the machine.

10. In a machine for molding articles from plastic stock, the combination with a set of dies and a molding machine comprising a plunger and a stationary anvil, whereby the plunger can be used to force the dies against the anvil, said set of dies being movable transversely into and out of the molding machine, of means for automatically moving the dies out of the molding machine and automatically opening the dies to permit the taking out of the molded article and putting the material in to be molded, manually controlled means for moving the dies back into the molding machine, means controlled by the bringing of the dies back to molding position for automatically introducing fluid under pressure under the plunger, and means for first heating and then cooling the dies.

11. In a machine for molding hollow articles from plastic sheet stock, the combination of a die, a driving shaft and a parallel shaft, means for driving the parallel shaft from the driving shaft at a reduced speed, an eccentric on said parallel shaft having a pawl thereon, a third shaft having a ratchet wheel through which the third shaft is operated, a handle centered on the third shaft and having a ratchet by which the shaft can be turned step by step by hand, means whereby the turning of the third shaft through the first step by hand will introduce steam into the dies to heat them and move the die from loading position into molding or pressing position, means operated by the movement of the die into molding position for automatically setting the first named pawl into engagement with the ratchet wheel, whereby the ratchet wheel will be operated once at each rotation of the parallel shaft, and means controlled by the step by step rotation of said third shaft for performing the rest of the molding operations and moving the die out of the machine for loading and unloading.

12. In a machine for molding articles from plastic stock, the combination of a die, a driving shaft and a parallel shaft, means for driving the parallel shaft from the driving shaft, an eccentric on said parallel shaft having a pawl thereon, a third shaft having a ratchet wheel through which the third shaft is operated, means operated by the movement of the die into molding position for automatically setting the pawl into engagement with the ratchet wheel, whereby the ratchet wheel will be operated once at each rotation of the parallel shaft, and means controlled by the step by step rotation of said third shaft for performing the molding operations and moving the die out of the machine for loading and unloading.

13. In a machine for molding articles from plastic stock, the combination of a shaft, an eccentric on the shaft, a pawl carried by the eccentric, an additional shaft having a series of cams thereon and provided with a ratchet wheel for operating it, a die, means operated by the die, when it is moved into the machine into a position for pressing and molding, for setting said pawl for engagement with the ratchet wheel, whereby at each rotation of the shaft the ratchet wheel will be rotated one step, and means controlled by the ratchet wheel for automatically performing the various operations for molding an article in said die and finally moving the die out of the pressing position into a position to have the article removed therefrom and new material introduced therein.

14. In a machine for molding hollow articles from plastic sheet stock, the combination with a shaft and means for driving that shaft, of a set of dies, an eccentric on the shaft, a pawl carried by the eccentric, a second shaft having a ratchet wheel thereon, means operated by the movement of the dies into molding position for moving the pawl into engagement with the ratchet wheel, whereby thereafter, at each rotation of the first named shaft, the ratchet wheel will be turned through a space represented by one tooth of the ratchet wheel, a series of cams on the ratchet wheel, and means operated and controlled by said cams for moving the dies from the molding position into the pressing position, pressing the dies together, introducing air under pressure into the dies to expand the article therein against the die surfaces, letting the air out of the dies, separating the dies, and finally forcing the dies out of the machine into loading position.

15. In a machine for molding articles from plastic stock, the combination with a shaft and means for driving that shaft slowly, of a set of dies, an eccentric on the shaft, a pawl carried by the eccentric, a second shaft having a ratchet wheel thereon, means for normally holding the pawl out of engagement with the ratchet wheel, means for moving the pawl into engagement with the ratchet wheel, whereby thereafter, at each rotation of the first named shaft, the ratchet wheel will be turned through a space represented by one tooth of the ratchet wheel, a series of cams on the ratchet wheel, and means operated and controlled by said cams for first introducing steam into the dies around the die surfaces for heating them, pressing the dies together, introducing air under pressure into the dies to expand the article therein against the die surfaces, introducing water into the dies behind the die surfaces for chilling the dies and setting the molded article against the die surfaces, letting the air out of the dies, and separating the dies.

16. In a machine for molding hollow articles from plastic sheet stock, the combination with a shaft and means for driving that shaft slowly, of a set of dies, an eccentric on the shaft, a pawl carried by the eccentric, a second shaft having a ratchet wheel thereon, means for normally holding the pawl out of engagement with the ratchet wheel, means operated by the movement of the dies into molding position for moving the pawl into engagement with the ratchet wheel, whereby thereafter, at each rotation of the first named shaft, the ratchet wheel will be turned through a space represented by one tooth of the ratchet wheel, a series of cams on the ratchet wheel, and means operated and controlled by said cams for first introducing steam into the dies around the dies surfaces for heating them, next moving the dies from the molding position into the pressing position, pressing the dies together, introducing air under pressure into the dies to expand the article therein against the die surfaces, forcing the dies together under greater pressure, introducing water into the dies behind the die surfaces for chilling the dies and setting the molded article against the die surfaces, letting the air out of the dies, separating the dies, and finally forcing the dies out of the machine into loading position.

17. In a die molding machine, the combination with the frame, a horizontal guide, and a plunger, of a die movable along the guide and movable in a transverse direction by the plunger, means for moving the die along the guide, and a flexible member connecting the frame and die for automatically opening the die when it is moved away from the molding position in the frame.

18. In a machine for molding hollow articles from plastic sheet stock, the combination with a shaft and means for driving that shaft, of a set of dies, an eccentric on the shaft, a pawl carried by the eccentric, a second shaft having a ratchet wheel thereon, means operated by the movement of the dies into molding position for moving the pawl into engagement with the ratchet wheel, whereby thereafter, at each rotation of the first-named shaft, the ratchet wheel will be turned through a space represented by one tooth of the ratchet wheel, and means operated and controlled by said ratchet wheel for operating the dies, introducing air under pressure into the dies, and finally forcing the dies out of the machine into loading position.

19. In a machine for molding articles from plastic stock, the combination with a shaft and means for driving that shaft slowly, of a set of dies, and means operated by said shaft for first introducing steam into the dies around the die surfaces for heating them, then pressing the dies together, introducing air under pressure into the dies to expand the article therein against the die surfaces, introducing water into the dies behind the die surfaces for chilling the dies and setting the molded article against the die surfaces, letting the air out of the dies, and separating the dies.

EARL R. PERSON.